United States Patent Office 3,555,049
Patented Jan. 12, 1971

3,555,049
VAPOR PHASE REACTION OF N₂F₄ WITH CERTAIN UNSATURATED ORGANIC COMPOUNDS
Ellington M. Magee, Scotch Plains, N.J., assignor to Esso Research and Engineering Company, a corporation of Delaware
No Drawing. Filed Oct. 30, 1961, Ser. No. 149,482
Int. Cl. C07d 5/00
U.S. Cl. 260—347.7                                6 Claims This invention is concerned with an improvement in the reaction of unsaturated compounds, such as olefinic $C_2$ to $C_8$ hydrocarbons and furan, in the vapor-phase with low pressure tetrafluorohydrazine, $N_2F_4$, to form adducts by the addition of $NF_2$ groups to carbon atoms linked together in the unsaturated compounds by double bonds. It is concerned with carrying out this reaction at high yield levels, more safely, at reasonable or increased rates, with lower concentrations of $N_2F_4$, and at low reaction temperatures.

Prior to the present invention, it was considered necessary to have the $N_2F_4$ reactant in high concentration and in excess of the stoichiometric proportion to make the addition reaction proceed toward completion and to counteract any tendency of the unsaturated compound to undergo polymerization. At the same time, it was deemed necessary to raise the reaction temperatures to as high a level as possible in order to have a reasonable rate of addition, and it was found that at high temperatures, $N_2F_4$ adducts tend to become unstable and that there are greater dangers of explosions in a vapor-phase reaction mixture.

Now, in accordance with the present invention, it has been found possible to carry out the vapor-phase addition reaction at lower temperatures in the range of about 20° to 200° C., at which the product is more stable, by using low concentrations or partial pressures of reactants and suitable higher proportions of inert gas to make the reaction proceed smoothly and at a suprising faster rate.

Employing the teachings of the present invention, reasonable rates of the addition reaction at lower temperatures or increased rates of reaction at any given temperature can be maintained by operating with an excess of the olefin or unsaturated compound reactant with respect to the $N_2F_4$ reactant and with an inert gas added in proportion substantially higher than the proportion of both reactants.

In carrying out the procedure of this invention, determinations of total pressure of the reaction mixture, the partial pressures of the reactants, and the partial pressure of the inert gas are conveniently made at about room temperature, i.e., about 20° to 25° C. The pressures stated are absolute pressures. Proportioning of the reactants and of the inert gas is critical for accomplishing the reaction within a reasonably short time, preferably substantially less than 25 minutes, in forming bis($NF_2$) adducts of the unsaturated organic reactants.

In the preferred embodiments of the vapor-phase reaction increased in rate by inert gas, the partial pressure measured at 25° C. of the $N_2F_4$ reactant introduced into the reaction zone is in the range of 38 to 380 mm. Hg abs., the partial pressure at 25° C. of the unsaturated organic reactant introduced into the reaction zone is at least as high as that of the $N_2F_4$ and in the range of 80 to 380 mm. Hg abs., so that the combined partial pressures of the reactants measured at 25° C. are in the range of 11.8 to 760 mm. Hg abs. The inert gas admixed with the reactants should be at least one-half the initial total pressure of the reaction mixture and may have partial pressure at 25° C. in the range of 124 to 760 mm. Hg abs. or higher. The upper limit of the inert gas proportion depends on a variety of factors, such as strength and size of the reactor, temperature of reaction, and apparatus for separation of the products. With such factors considered, an upper limit of the inert gas partial pressure at 25° C. is 7600 mm. Hg abs.

The unsaturated compounds to be reacted with $N_2F_4$ using the principles of the present invention are olefins such as ethylene, other $C_2$ to $C_6$ alkenes, dienes and trienes such as 1,3-butadiene, pentadiene, hexadiene, hexatriene, cyclohexadiene, benzene, unsaturated cyclic ethers such as furan, and unsaturated organic compounds having functional groups, e.g., vinyl isocyanate. In general, the unsaturated compound used as the reactant should have a boiling point below 100° C. so that it and the reaction product can be maintained in the vapor-phase under the reaction conditions. These reactants in general contain 2 to 6 carbon atoms and 1 to 3 double bonds per molecule.

Suitable inert gases to be used for the reaction are methane, ethane, carbon dioxide, helium and nitrogen. Other inert gases may also be used, e.g., $CF_3$ and $CCl_2F_2$, but the inert gases should be preferably a normally gaseous compound which is not reactive under the conditions of reaction and which can be easily separated by fractionation from the products.

Generally the reaction temperatures for the addition reaction with the inert gas-diluted, relatively low-pressure reactants are in the range of about 20° to 200° C. to prevent undesired side reactions, such as polymer formation, and to prevent a decomposition of the $N_2F_4$ which results in the formation of $N_2$, nitrogen oxides and CF compounds, i.e., compounds in which fluorine is linked to carbon in the resulting organic product.

A series of experiments have shown that the rate of formation of the $N_2F_4$ adducts of olefins is proportional to the partial pressure or concentration of the olefin and proportional to the square root of the partial pressure concentration of the $N_2F_4$ in an unexpected manner. This relationship has been shown to hold regardless of whether the mole proportion of the $N_2F_4$ to the olefin is less than one or greater than one, and regardless of the presence of inert gas. A demonstration of this relationship is given in the following Table I which summarizes experimental conditions and yields of $C_2H_4(NF_2)_2$ based on the theoretical yield.

TABLE I.—YIELDS OF N₂F₄-ETHYLENE ADDUCT
($NF_2$)$CH_2$—$CH_2$($NF_2$)

| Ratio $N_2F_4$/ $C_2H_4$ (molar) | Reaction temperature, °C. | Pressure at 25° C. (initial) mm. Hg. | Yield (percent) | Time, minutes for 90% yield |
|---|---|---|---|---|
| 1:3 | 125 | 535 | 94 | 100 |
| 1:2 | 150 | 765 | 97 | 25 |
| 1:1 | 125 | 666 | 91 | 500 |
| 2:1 | 110 | 692 | 90 | 775 |

In the runs shown in Table I, no polymer formation was detected, the yields of the adduct based on theoretical were as high when the $N_2F_4$ reactant was used in less than a 1 mole proportion to the ethylene as when an excess of $N_2F_4$ was used. Moreover, a very fast rate was shown to be capable of being obtained even at the same reaction temperature with the lower mole proportion of the $N_2F_4$ to the olefin. These facts indicate that a desirable method of carrying out the reaction under steady state conditions in a flow reactor within a reasonable time can be obtained by using about 0.25 to 1 mole proportion of $N_2F_4$ per mole of the unsaturated organic reactant.

In the foregoing studies, the reaction of $N_2F_4$ with ethylene was used as a model reaction. This addition proceeds more smoothly with little, if any, side reactions in using lower $N_2F_4$ proportions. In various experiments, batches of $N_2F_4$ from different sources and different degrees of purity, about 98 to 99% $N_2F_4$, were used with no appreciable differences in results. The reactions were carried out essentially in the same manner with accurate temperature control (about 0.5° C. deviation). The reactions were carried out in different reactors, one of which was a Pyrex bulb with a surface/volume ratio of 0.608, and the other was a coil Pyrex reactor tube with a surface/volume ratio of 1.62. It was determined that the wall surface of the reactors did not have an appreciable effect on the rate of reaction.

Two different procedures were used for charging the reactors for tests with and without inert gas admixed.

In a batch procedure, the $N_2F_4$ was first added and frozen. Then the reactor was degassed, after which it was warmed up to room temperature (25° C.) and the pressure was recorded, after which the ethylene was added, the mixture frozen for degassing and, finally, total pressure at room temperature (25° C.) was determined. Inert gas, when used, was then added. Finally, the gaseous mixture was brought to the correct reaction temperature. In the flow reaction procedure, the reactants, and inert gas if used, were expanded into the reactor from storage bulbs. The pressures of the gases in the system was followed manometrically.

In using the continuous flow reactor system, the gaseous reaction mixture is passed as a stream through the reaction zone and the adduct product mixed with unreacted reactants flows continuously from the opposite inlet end of the reaction zone through the outlet of the reactor to means for collecting and separating the higher boiling adduct product as a condensate from the unreacted gaseous reactants or reactant. With the unsaturated organic compound or olefin used in excess of the stoichiometric proportion with respect to the $N_2F_4$, the unsaturated organic compound or olefin is separated as a vapor and may be recycled to be admixed with additional $N_2F_4$ and passed again through the reaction zone or through another reaction zone. A second flow reactor may be used in tandem with a first reactor for a second stage of reaction of the unreacted organic reactants or of the partially reacted adduct product.

By operating with varied proportions of the reactants and also by addition of varying amounts of inert gas, it was determined that the rate of reaction depends also on the total pressure and, more specifically, on the square root of the total pressure. Thus, for a given initial pressure of olefin and $N_2F_4$, the rate is doubled by increasing the total pressure by a factor of 4 through the addition of inert gas. This corresponds approximately to an increase of 12° C. (22° F.) in reaction temperature. Conversely, if a certain rate is desired and is obtainable at a certain temperature, then this rate may be obtained at a 12° C. lower temperature by simply increasing the total pressure by a factor of 4 through addition of inert gas. Accordingly, rates can be maintained by lowering the amount of $N_2F_4$ and increasing the amount of inert gas by a similar amount. If the $N_2F_4$ concentration is decreased by a factor of 2 and the total pressure is increased by a factor of 2 through addition of inert gas, then the rate will remain the same and explosive hazards will be decreased. The following table shows data supporting the principle of using an inert gas with lowered concentration of $N_2F_4$ for maintaining a desired rate of reaction.

TABLE II.—REACTION OF $C_2H_4$ WITH $N_2F_4$ AT 125° C.

| Initial pressure $N_2F_4$ mm. Hg | Initial pressure $C_2H_4$ mm. Hg | Initial pressure $C_2H_6$ (inert gas) mm. Hg | (Initial total pressure)$^{1/2}$ | $k_1 \times 10^4$ mm.$^{-1/2}$ min.$^{-1}$ | $10^5 \times k_1 \div$ (initial total pressure)$^{1/2}$ |
|---|---|---|---|---|---|
| 104.5 | 236.5 | 0 | 18.46 | 4.17 | 2.26 |
| 58.8 | 132.7 | 0 | 13.83 | 3.31 | 2.39 |
| 33.5 | 75.5 | 0 | 10.45 | 2.53 | 2.42 |
| 19.4 | 43.9 | 0 | 7.95 | 1.78 | 2.24 |
| 62.9 | 130.7 | 202.4 | 19.90 | 4.23 | 2.13 |
| 38.8 | 80.5 | 124.7 | 15.62 | 3.24 | 2.07 |
| 316.8 | 63.9 | 0 | 19.50 | 3.99 | 2.05 |
| 199.0 | 40.2 | 0 | 15.47 | 3.68 | 2.38 |
| 127.0 | 25.6 | 0 | 12.35 | 3.80 | 2.57 |

Rate constant expression:
Rate=$k_1$(olefin)($N_2F_4$)$^{1/2}$.
Rate=$k$(total pressure)$^{1/2}$(olefin)($N_2F_4$)$^{1/2}$.

The data in Table II indicate how the inert gas can be used to replace $N_2F_4$ in maintaining a higher rate of reaction. The last column to the right of Table II shows that the rate constant depends on the (total pressure) $^{1/2}$.

The effect of ethane, $C_2H_6$, used as an inert gas is nearly the same as the pure reactants and products in maintaining a certain rate of reaction. Other inert gases are not necessarily quite as efficient, e.g. carbon dioxide and nitrogen. The compared effects of different inert gases are shown in the following table.

TABLE III.—EFFECT OF INERT GAS

| Inert gas | $k_{obs.}$ mm.$^{-1/2}$ min.$^{-1}$ | $k_{calc.}$* mm.$^{-1/2}$ min.$^{-1}$ | $k_{obs.}/k_{calc.}$ |
|---|---|---|---|
| $C_2H_6$ | 4.23 | 3.14 | 1.35 |
| $C_2H_6$ | 3.24 | 2.47 | 1.31 |
| $C_2H_6$ | 2.94 | 1.96 | 1.48 |
| $CO_2$ | 3.73 | 2.61 | 1.43 |
| $CO_2$ | 3.60 | 2.81 | 1.28 |
| $N_2$ | 3.84 | 3.16 | 1.22 |
| $N_2$ | 3.06 | 2.52 | 1.22 |

*$k_{calc.} = 2.26 \ (P_{oN_2F_4}+P_{oC_2H_4})^{1/2}$.

In the last column of Table III is shown the relative value of the observed rate constant with respect to a calculated constant, the calculated constant being that which would have been arrived at had the inert gas not been present. Helium was found nearly as effective as ethane according to tests on a gaseous mixture containing 1.9 moles of olefin to 1 mole of $N_2F_4$ and He in a higher proportion to make the value of (Initial Total Pressure) $^{1/2}$=20.2 mm.$^{1/2}$ with the resulting $k \times 10^4$=4.02. In plotting the data points to determine the rate constants graphically, the data were found to fit remarkably well.

As another example, a study was made of the vapor-phase conversion of furan to the bis($NF_2$) adduct. In this study a long coil flow reactor with separate preheating sections for $N_2F_4$ and furan was used. The furan was vaporized using, in one instance $N_2F_4$ gas, and in another, inert gas, and the mixture was metered into the coil. The basic laboratory reactor was designed to give 5 minutes contact time at a flow rate of about 1 gram per hour of olefin feed. Actual runs on furan were made at contact times of 2 to 20 minutes. There were difficulties in vaporizing the furan mixed with hot $N_2F_4$, but in successful runs, furan was mixed with $N_2F_4$ at a lower temperature and then vaporized with inert gas, e.g., $N_2$.

At lower residence time, the flow unit conversion rate of the furan to bis($NF_2$) adducts was found to be in agreement with the rate equation which sets forth that the rate is proportional directly to the concentration of the olefin employed multiplied by the square root of the concentration of the $N_2F_4$ and further multiplied by the square root of the total pressure. It was observed that at low pressures of the reactants without inert gas, the vapor-phase conversion of furan to the bis($NF_2$) adduct of furan gave rise to severe polymer formation even at relatively low reaction temperatures, e.g., 150° C., but further runs showed that by increasing the pressure mainly by addition of inert gaseous diluent, the temperature of reaction could be lowered to about 100° C. to obtain a high conversion of the furan to the bis adduct product with decrease in polymer formation.

What is claimed is:

1. In the addition reaction of an unsaturated organic compound reactant in vapor-phase with $N_2F_4$ to form an adduct, said unsaturated organic compound containing 2 to 6 carbon atoms and 1 to 3 double bonds, the improvement which comprises admixing $N_2F_4$ having a partial pressure of 38 to 380 mm. Hg abs. at 25° C. with the unsaturated organic reactant having a partial pressure of 80 to 380 mm. Hg abs. at 25° C. and with an inert gas having a partial pressure at 25° C. above the combined partial pressures of the $N_2F_4$ and organic reactants to form a gaseous reaction mixture, reacting the reactants in said gaseous reaction mixture at a reaction temperature in the range of about 20° to 200° C., and recovering a resulting adduct product containing $NF_2$ groups linked to carbon in the unsaturated organic compound.

2. In the addition reaction set forth in claim 1, the inert gas is admixed with the reactant in a proportion to have a partial pressure at 25° C. of at least one-half the total pressure at 25° C. of the resulting gaseous reaction mixture and in the range of 124 to 7600 mm. Hg absolute.

3. In the addition reaction set forth in claim 1, the unsaturated organic reactant being a $C_2$ to $C_6$ compound, the inert gas being ethane, and the adduct product being bis($NF_2$) derivative formed by addition of an $NF_2$ group to carbon constituents linked together by a double bond in the unsaturated $C_2$ to $C_6$ organic compound.

4. In the addition reaction defined in claim 1, the organic reactant being ethylene and the adduct being bis($NF_2$)ethane.

5. In the addition reaction defined in claim 1, the organic reactant being 1,3-butadiene.

6. In the addition reaction defined in claim 1, the organic reactant being furan.

References Cited

UNITED STATES PATENTS

| | | | |
|---|---|---|---|
| 3,342,866 | 9/1967 | Passannante et al. | 260—583 |
| 3,354,210 | 11/1967 | Beach et al. | 260—563 |

LELAND A. SEBASTIAN, Primary Examiner

U.S. Cl. X.R.

260—453, 563, 583